June 21, 1955 K. STREET, JR 2,711,362
CURIUM-AMERICIUM SEPARATION AND PURIFICATION PROCESS
Filed April 11, 1949 2 Sheets-Sheet 1

INVENTOR.
KENNETH STREET, Jr.
BY
Roland A. Anderson
ATTORNEY.

June 21, 1955 K. STREET, JR 2,711,362
CURIUM-AMERICIUM SEPARATION AND PURIFICATION PROCESS
Filed April 11, 1949 2 Sheets-Sheet 2

INVENTOR.
KENNETH STREET, Jr.
BY
ATTORNEY.

United States Patent Office 2,711,362
Patented June 21, 1955

2,711,362

CURIUM-AMERICIUM SEPARATION AND PURIFICATION PROCESS

Kenneth Street, Jr., Berkeley, Calif., assignor to the United States of America as represented by the United States Atomic Energy Commission Application April 11, 1949, Serial No. 86,739

7 Claims. (Cl. 23—14.5)

The present invention relates to a new and improved process for the separation of transuranic elements from the elements of the lanthanide series. More particularly, it relates to an ion-exchange process suitable for separating curium from americium and from other elements of the transuranic and lanthanide series. This process provides for the separation and purification of curium from a solution in which it is intermixed with contaminating materials by means of adsorbing curium along with various contaminants upon an adsorbent and then selectively eluting the curium and other adsorbed materials from the adsorbent by means of a specific elutriant.

Reference herein to any of the elements is to be understood as denoting the element generically, whether in its free state or in the form of a compound, unless otherwise indicated by the context.

It is now commonly known that the transuranic elements are virtually non-existent in nature. However, these elements may be artificially produced by nuclear transmutations of other relatively heavy elements, such as uranium and elements of the transuranic series; such processes not forming a part of the present invention.

In the past, considerable difficulty has been encountered in effectively separating artificially produced elements, such as curium, americium, and plutonium from each other and from the various fission products with which such elements are intermixed. Many of the fission products do not respond to well-established methods of separation and, for this reason, a new and better purification process has now been developed.

Furthermore, it will be clearly seen that the separation and purification of the various products formed from the irradiation of uranium and transuranic elements is an extremely difficult task in view of the fact that relatively small quantities of the fission products may be present in the material to be processed.

The problem is further complicated by the presence of various isotopes and the fact that the elements to be separated may not always be those formed at the time of fission, but may actually represent conversion products from certain of the fission products which have undergone extremely rapid change; that is, those fission products having very short half-lives. Fission products ranging in half-lives of from three seconds to $10^4$ years have been isolated and identified.

I have found that selected components of a solution may be separated and recovered by a process involving contacting said solution with an adsorbent under conditions favoring adsorption of the selected components and selectively eluting said components from the adsorbent by means of an elutriant comprising an aqueous solution of hydrogen chloride in suitable concentration.

It is therefore an object of the present invention to provide a simple, practical, quantitative process for separating chemical elements from each other and for purifying the same.

It is an object of the present invention to provide a novel and useful process for separating the transuranic series of elements from each other and from the elements of the lanthanide series.

It is also an object of the present invention to provide a new process for the separation of curium from americium.

Still another object of the present invention is to provide a new and improved process for separating curium and americium from the lanthanide series of elements.

Other objects and advantages will be apparent from the following description and from the accompanying drawings, in which.

Considerable study has been made of the subject of ion-exchange resins during the past few years, and as a consequence it has been found that certain resins exhibit very selective and pronounced adsorptive properties for a large number and variety of cations or metallic radicals. Furthermore, ion-exchange resins can now be provided which are stable in acid, neutral, or alkaline solutions, have high capacity, and can be regenerated with a great degree of chemical efficiency.

The adsorption of the particular materials to be separated and purified is carried out by a process employing cation-exchange adsorbents; that is, those in which the cation of the adsorbent is exchanged for a similarly charged ion of the substance being adsorbed.

I have found that my process is particularly effective where the adsorbent used is a relatively inert organic material containing free sulfonic acid groups. Thus the adsorbent may comprise poly-vinyl aryl resins, phenol-formaldehyde resins, lignite, phenol-tannic acid resins, or the like, which may contain numerous —R—SO$_3$—R' groups in which R is an organic group and in which R' may be hydrogen or may be a metal ion, preferably Na$^+$. A cation-exchange adsorbent found to be eminently suited for the present purposes is a sulfonated polymerizate of a poly-vinyl aryl compound, such as that described in U. S. Patent 2,366,007 (G. F. D'Alelio, August 11, 1942).

In the adsorption process, the hydrogen of the sulfonic acid group is replaced by a cation of the substance to be adsorbed, which then forms a more or less loosely associated molecule with the resin.

The adsorbent should be finely divided, it being particularly advantageous to use adsorbents comminuted to a particle size of approximately 100 to 150 U. S. mesh.

The solutions which may be treated in accordance with the present invention are subject to wide variation. Especially well suited for present purposes are dilute aqueous solutions of the materials to be separated. The solution should be free from deleterious concentrations of substances which hinder adsorption, for instance, complexing agents. Likewise, excess acidity or alkalinity of the solution should be avoided or mitigated prior to adsorption. In addition, it has been found particularly preferable to adsorb the materials from aqueous solutions of chlorides or perchlorates.

The solutions to be treated in the present process may contain a wide variety of materials since the principle of selective adsorption is based on the theory that every material adsorbed has some definite time of elution, generally referred to as its period of elution. This period depends on variations of the process, notably the specific elutriant employed.

Figure 1:
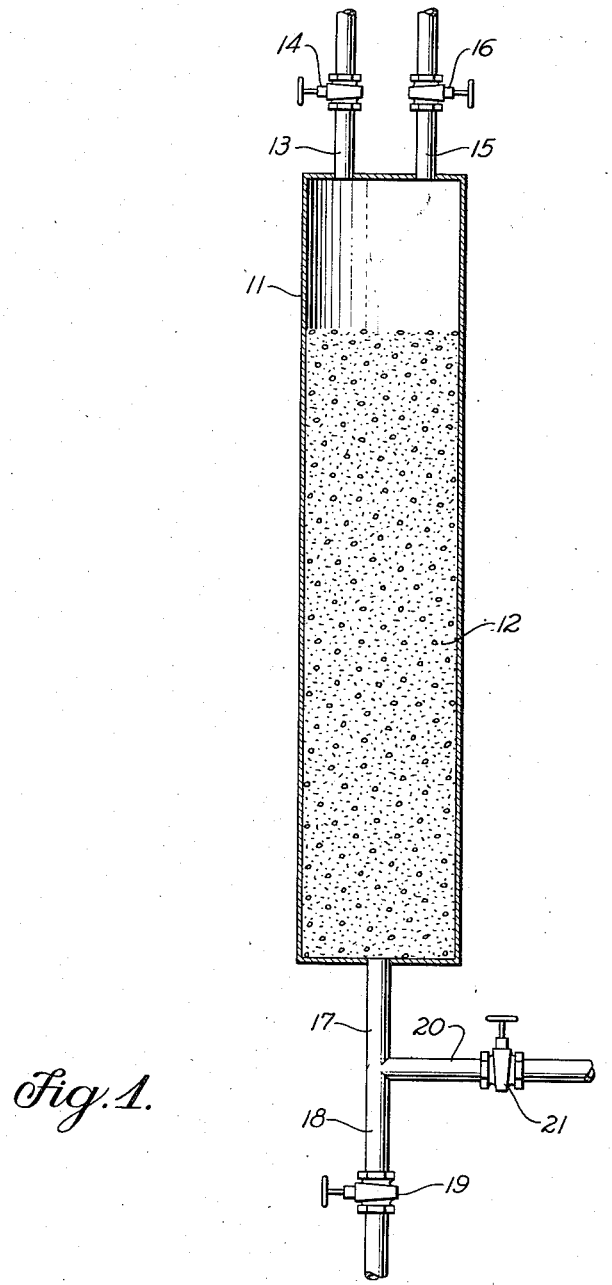
Figure 1 is a diagram of a typical ion-exchange separation apparatus.

It is very desirable in the elution process that the flow of each solution through the adsorbent bed be substantially unidirectional, and that the flow of the elutriant be in the same direction as the flow of the feed solution during adsorption. In this connection, it has been found preferable to utilize an adsorbent bed disposed in a vertical column, as shown in Fig. 1 of the accompanying drawings and then passing the solution downward by gravity through the bed. When such an arrangement is used, solute components of the feed solution are ordinarily adsorbed in a plurality of bands throughout the bed in the adsorption step. Upon subsequent chromatographic elution, each of the constituents has a specific average rate of exchange between the adsorbent and the elutriant, causing each constituent to move through the bed at a different rate of travel. Separate eluate fractions, each enriched in a particular constituent, may thus be successively collected. Moreover, since the separation depends on differential rate of movement through the bed, it follows generally that the greater the thickness of adsorbent through which the chromatographic eluate flows, the greater will be the degree of separation.

In conducting these processes, the scale of operations may be of a size ranging from that employing very small laboratory scale adsorption columns several millimeters in diameter to large industrial scale utilizing columns several feet in diameter.

In the practice of my invention, I have found that certain operation variables such as the flow rate of the elutriant may be varied over wide limits without materially affecting the separation of the various adsorbed components, although in general the purity of the separated components is greatest when the column is operated near or at equilibrium conditions. Usually the elution solution is gravity fed through the column and the rate of flow is dependent on such things as the porosity of the adsorbent bed and the length and cross-sectional area of the particular column used.

Referring now specifically to Fig. 1 of the accompanying drawing where there is shown a diagrammatical illustration of a system which may be utilized in the practice of the present invention, 11 designates a column containing a suitable adsorbent 12. To the upper portion of column 11 are connected line 13 controlled by valve 14 and line 15 controlled by valve 16. From the lower portion of column 11 is extended line 17 which feeds into line 18 controlled by valve 19, and line 20 controlled by valve 21.

In the operation of the above-described system, a solution containing curium together with other transuranic elements is passed through line 13 into column 11 wherein curium and the other dissolved materials such as elements of the lanthanide series which may be present, are adsorbed by adsorbent 12, the solvent passing out from the bottom of the column through line 20. Valve 14 is then closed, valve 16 opened, and an elutriant admitted through line 15. The elutriant chromatographically elutes the adsorbate, the various components moving down through the adsorbent bed 12 at different specific rates. Upon leaving the column, the fraction of eluate containing the particular material desired in a state of relatively increased purity is passed through lines 17 and 18 to storage or further processing, valve 21 being closed. This is followed by the fractions containing the other material which are in turn passed through lines 17 and 20 to disposal or further treatment, valve 19 being closed.

In my process for chromatographic elution, the effectiveness of separation is materially affected by the concentration of the elutriant. The proper concentration to be used under the particular circumstances depends on several factors including the general types of materials to be separated, the relative quantities thereof, and the desired degree of separation and purity of the final product.

I have discovered that it is particularly advantageous to use an aqueous solution of hydrogen chloride in high concentration when a substantial portion of both transuranic and lanthanide materials are present in the initial solution. However, effective separations may be accomplished at relatively low concentrations of elutriant when dealing with solutions containing only the relatively lower atomic numbered rare earth elements in admixture with various transuranic elements.

Furthermore, I have found that various transuranic and lanthanide elements are eluted from the ion exchange column in particular order while using varying concentrations of hydrogen chloride elutriant. In this connection reference is now made to Fig. 2 of the drawings which shows the elution curve obtainable when 6 M hydrogen chloride elutriant is used.

It will be noted that the order of elution of the various lanthanide elements is in the order of decreasing atomic number, e. g., element 61 precedes cerium. At the concentration of 6 M, a separation of curium from americium may be obtained, the curium preceding the americium. However, at this particular concentration of the elutriant the separation of americium and curium from all of the lanthanide elements is not completely effected as the elution periods of the lanthanides, samarium through lutecium, overlap the elution periods of the transuranic elements.

Figure 3:
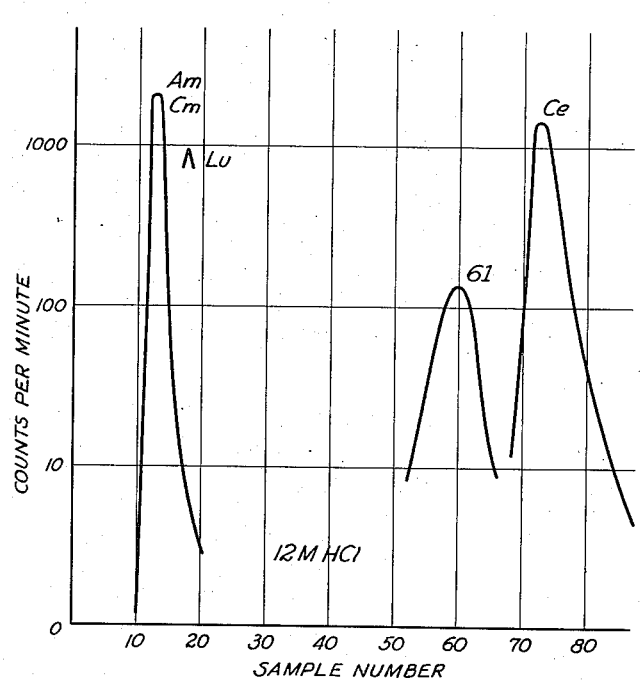
Fig. 3 is a graph showing the results obtainable from elution with 12 M hydrogen chloride solution.

Fig. 3 of the drawings shows the elution curve obtainable when using 12 M hydrogen chloride elutriant. The point of special interest therein is that at this particular concentration of elutriant, the transuranic elements, americium and curium, are eluted at substantially the same period, and the elution period of the lanthanides (beginning with lutecium and ending with cerium) shifts farther to the right of the elution periods of the transuranic elements, thereby affording complete separation of $U^{VI}$, $Np^V$, $Pu^{III}$, Am, and Cm from all the lanthanide elements.

Figure 4:
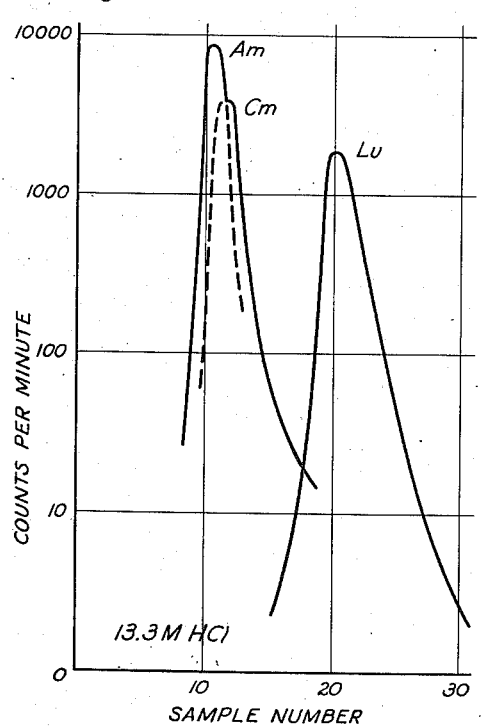
Fig. 4 is a graph showing the results obtainable from elution with 13.3 M hydrogen chloride solution.

The elution curve obtainable when the column is eluted with 13.3 M hydrogen chloride elutriant is shown in Fig. 4 of the drawings. At this concentration of elutriant the elution periods of the lanthanide elements move still farther to the right as shown by the position of the elution period of lutecium, which is the first member of the lanthanide series of elements to be eluted. Of particular interest is the fact that now the order of elution of the transuranic elements is reversed from that obtainable at the concentration of 6 M as shown before. Thus at 13.3 M hydrogen chloride concentration the americium is eluted first, curium second, and then the members of the lanthanide series of elements in their normal order of decreasing atomic number.

Figure 2:
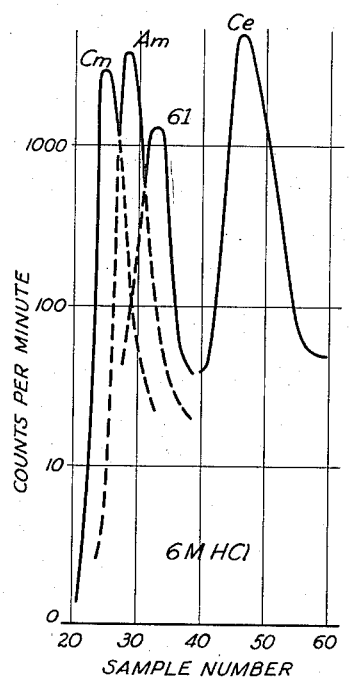
Fig. 2 is a graph showing the results obtainable from elution with 6 M hydrogen chloride solution according to the invention.

*Example Number 1.*—A separation column 10 cm. long and 1 mm. in diameter is provided with a sulfonated polymerizate of a poly-vinyl aryl compound in the acid form as the adsorbent bed. An aqueous mixture comprising approximately $1 \times 10^4$ alpha counts/minute of americium, $6 \times 10^3$ beta counts/minute of elements 61, $1 \times 10^4$ alpha counts/minute of curium, and $1 \times 10^4$ beta counts/minute of cerium is contacted with the adsorbent bed in the column and allowed to come to equilibrium. The adsorbate is then eluted with a 6 M hydrogen chloride solution and fractional products are collected. Fig. 2 of the drawings is a plot of disintegration counts per minute on a logarithmic scale against fractional product numbers, showing results obtainable under the above conditions.

*Example Number 2.*—A separation column 10 cm. long and 1 mm. in diameter is provided with a sulfonated polymerizate of a poly-vinyl aryl compound in the acid form as the adsorbent bed. An aqueous mixture comprising approximately $2 \times 10^4$ beta counts/minute of lutecium, $2 \times 10^4$ alpha counts/minute of americium, $2 \times 10^4$ alpha counts/minute of curium, and $2 \times 10^4$ beta counts/minute of element 61 is contacted with the adsorbent bed in the column and allowed to come to equilibrium. The adsorbate is then eluted with 12 M hydrogen chloride solution and fractional products are collected. Fig. 3 of the drawings is a plot of disintegration counts/minute on a logarithmic scale against fractional product numbers, showing results obtainable under the above conditions.

*Example Number 3.*—A separation column 10 cm. long and 1 mm. in diameter is provided with a sulfonated polymerizate of a poly-vinyl aryl compound in the acid form as the adsorbent bed. An aqueous mixture comprising approximately $3.5 \times 10^4$ beta counts/minute of lutecium, $2 \times 10^4$ alpha counts/minute of americium, and $2 \times 10^4$ alpha counts/minute of curium is contacted with the adsorbent bed in the column and allowed to come to equilibrium. The adsorbate is then eluted with 13.3 M hydrogen chloride solution and fractional products are collected. Fig. 4 of the drawings is a plot of disintegration counts/minute on a logarithmic scale against fraction product numbers, showing results obtainable under the above conditions.

The term "eluting agent," "elutriant," or equivalent is intended to include a material which removes adsorbed material from a bed of adsorbent.

The term "adsorption" is utilized in referring to the removal of components from solution by a solid material. It is to be understood, however, that this invention is not to be limited in any sense by the theory upon which the process is based and that this term is used as it is generally employed in the art of chromatographic separation.

The expression "transuranic elements" is intended to include those elements having atomic numbers greater than 92.

The expression "lanthanide elements" is intended to include those elements having atomic numbers of from 58 to 71, inclusive.

While the salient features of this invention have been described in detail with respect to several embodiments, it will, of course, be apparent that numerous modifications may be made within the spirit and scope of this invention, and it is not therefore desired to limit the invention to the exact details shown except in so far as they may be defined in the following claims.

What is claimed is:

1. In a process for recovering transuranic elements from a solution containing the same together with lanthanide elements, the steps comprising contacting the solution with a sulfonated polymerizate of a poly-vinyl aryl compound to adsorb said elements thereon, chromatographically eluting said elements through a column of said sulfonated polymerizate of a poly-vinyl aryl compound with a hydrochloric acid solution having a concentration in the range of about 6 M to 13.3 M to yield fractions thereof containing enhanced proportions of said transuranic elements, and collecting said fractions containing enhanced proportions of transuranic elements.

2. In a process for separating americium and curium from a solution containing the same together with lanthanide elements, the steps comprising contacting said solution with a sulfonated polymerizate of a poly-vinyl aryl compound to adsorb the americium and curium and said elements thereon, chromatographically eluting said adsorbed materials through a column of said sulfonated polymerizate with a hydrochloric acid solution of about 13.3 M concentration to yield fractions thereof containing americium and curium substantially separated from each other and from said lanthanide elements, and collecting said fractions.

3. In a process for separating curium from a solution containing the same together with americium and lanthanide elements lower than lutecium, the steps comprising contacting the solution with a sulfonated polymerizate of a poly-vinyl aryl compound to adsorb said materials thereon, chromatographically eluting said adsorbed materials through a column of said sulfonated polymerizate with a hydrochloric acid solution of about 6 M concentration to yield fractions thereof containing curium separated from said americium and lanthanide elements, and collecting said fractions.

4. In a process for separating americium from a solution containing the same together with curium and lanthanide elements lower than samarium, the steps comprising contacting the solution with a sulfonated polymerizate of a poly-vinyl aryl compound to adsorb said materials thereon, chromatographically eluting said adsorbed materials through a column of said sulfonated polymerizate with a hydrochloric acid solution of about 6 M concentration to yield fractions thereof containing americium separated from said curium and lanthanide elements, and collecting said fractions.

5. In a process for separating materials of the group consisting of $U^{VI}$, $Np^V$, $Pu^{III}$, Am and Cm dissolved in a solution from lanthanide elements also dissolved therein, the steps comprising adsorbing said materials and lanthanide elements on a sulfonated polymerizate of a poly-vinyl aryl compound, eluting said materials and lanthanide elements through a column of said sulfonated polymerizate with a hydrochloric acid solution having a concentration of above about 12 M thereby yielding fractions of eluate containing said materials separated from said lanthanide elements, and collecting said fractions of eluate.

6. In a process for separating americium from curium, the steps comprising preparing a solution of americium and curium compounds of the group consisting of chlorides and perchlorates, adsorbing said americium and curium compounds from said solution on a sulfonated polymerizate of a poly-vinyl aryl compound, eluting said americium and curium compounds through a column of said sulfonated polymerizate with hydrochloric acid of about 6 M concentration to yield fractions of eluate containing americium and curium separated from each other, and collecting the separated fractions.

7. In a process for separating americium and curium from the lanthanide elements, the steps comprising preparing a solution of the group consisting of chloride and perchlorate compounds of americium, curium, and the lanthanide elements, adsorbing said americium, curium and lanthanide compounds from said solution on a sulfonated polymerizate of a poly-vinyl aryl compound, eluting said elements from said sulfonated polymerizate with hydrochloric acid of above about 12 M concentration thereby yielding fractions of eluate containing americium and curium separated from said lanthanide elements, and collecting said separated fractions of eluate.

References Cited in the file of this patent

Russell et al.: Fractionation of the Rare Earths by Zeolite Action, Journal of the American Chemical Society, vol. 65, pages 595–600 (1943). Copy in Scientific Library.

Werner et al.: Isolation of Curium, Nuclear Science Abstracts, vol. 1, No. 5, page 261 (1948). Copy in Scientific Library.

Tompkins et al.: Journal of the American Chemical Society, vol. 69, pages 2769–2777 (1947). Copy in Scientific Library.